US010698089B2

(12) United States Patent
Kaneko et al.

(10) Patent No.: US 10,698,089 B2
(45) Date of Patent: Jun. 30, 2020

(54) MIRROR UNIT AND OPTICAL-SCANNING-TYPE OBJECT DETECTION DEVICE

(71) Applicant: Konica Minolta, Inc., Tokyo (JP)

(72) Inventors: Naoki Kaneko, Hachioji (JP); Yoshinori Ide, Hino (JP); Yoshifumi Tamura, Toyokawa (JP); Hajime Mori, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 376 days.

(21) Appl. No.: 15/747,169

(22) PCT Filed: Jun. 8, 2016

(86) PCT No.: PCT/JP2016/067010
§ 371 (c)(1),
(2) Date: Jan. 24, 2018

(87) PCT Pub. No.: WO2017/018065
PCT Pub. Date: Feb. 2, 2017

(65) Prior Publication Data
US 2018/0217238 A1 Aug. 2, 2018

(30) Foreign Application Priority Data
Jul. 27, 2015 (JP) .................. 2015-147461

(51) Int. Cl.
G01C 3/08 (2006.01)
G01S 7/481 (2006.01)
(Continued)

(52) U.S. Cl.
CPC .............. *G01S 7/4817* (2013.01); *G02B 5/09* (2013.01); *G02B 7/1821* (2013.01); *G02B 26/12* (2013.01);
(Continued)

(58) Field of Classification Search
CPC ........ G02B 5/09; G02B 7/1821; G02B 26/12; G02B 26/129; G02B 26/121; G01S 7/4817; G01S 17/931
(Continued)

(56) References Cited

U.S. PATENT DOCUMENTS

| 4,458,982 A * | 7/1984 | Blain | H04N 3/09 250/236 |
| 4,733,072 A * | 3/1988 | Lettington | G01S 7/4817 250/235 |
| 5,000,529 A * | 3/1991 | Katoh | G02B 5/09 235/462.39 |

FOREIGN PATENT DOCUMENTS

WO 2013047174 A1 4/2013

OTHER PUBLICATIONS

International Preliminary Report on Patentability dated Jul. 12, 2016 for PCT/JP2016/067010 and English translation.
(Continued)

*Primary Examiner* — Mark Hellner
(74) *Attorney, Agent, or Firm* — Lucas & Mercanti, LLP

(57) ABSTRACT

An optical unit contains an optical element made of resin obtained by integrally forming a reflector in which a reflecting surface which reflects a light flux is formed on an outer peripheral side surface, and a flange extending in a direction orthogonal to the reflector to support the reflector; a rotary driving body which rotates the optical element; and a connecting device which connects the flange of the optical element to the rotary driving body, the optical element being capable of rotating around a rotational axis of the rotary driving body.

5 Claims, 7 Drawing Sheets

(51) Int. Cl.
   *G02B 26/12* (2006.01)
   *G02B 7/182* (2006.01)
   *G02B 5/09* (2006.01)
   *G01S 17/931* (2020.01)
(52) U.S. Cl.
   CPC ......... *G02B 26/121* (2013.01); *G02B 26/129* (2013.01); *G01S 17/931* (2020.01)
(58) Field of Classification Search
   USPC ....................................................... 356/3.09
   See application file for complete search history.

(56) References Cited

OTHER PUBLICATIONS

International Search Report dated Jul. 12, 2016 for PCT/JP2016/067010 and English translation.

* cited by examiner

MIRROR UNIT AND OPTICAL-SCANNING-TYPE OBJECT DETECTION DEVICE

CROSS REFERENCE TO RELATED APPLICATION

This Application is a 371 of PCT/JP2016/067010 filed on Jun. 8, 2016, which, in turn, claimed the priority of Japanese Patent Application No. JP 2015-147461 filed on Jul. 27, 2015, both applications are incorporated herein by reference.

TECHNICAL FIELD

The present invention relates to a mirror unit suitable for use in an object detection device which detects an object by irradiation of laser light and the like and an optical scanning type object detection device.

BACKGROUND

In recent years, in the field of automobiles, air vehicles and the like, in order to detect an obstacle located ahead in a travel direction with a high degree of accuracy, a laser scanning type measuring machine which obtains information of the obstacle on the basis of a relationship between laser light externally emitted and reflected light striking the obstacle to be reflected (or the reflected light striking a structure after passing through the object to return) is developed to be already in practical use.

In a general laser scanning type measuring machine, a light projecting system is formed of a laser diode and a collimator, and a light receiving system is formed of a light receiving lens (or a mirror) and a light detecting element such as a photodiode. A reflecting mirror provided with a reflecting surface is further arranged between the light projecting system and the light receiving system. Such laser scanning type measuring machine reflects the light emitted from the light projecting system by a rotating reflecting surface by rotation of the reflecting mirror and irradiates in a direction in which detection of the object is desired. This is advantageous in that this may measure the object in a wide range in a two-dimensional manner instead of measuring at one point.

A motor or the like is used as a power source for rotating the reflecting mirror for laser light scanning. On the other hand, there also is a request to make the reflecting mirror of resin in order to reduce cost and weight. Therefore, a manner of connecting the reflecting mirror made of resin to a rotary shaft of the motor or the like poses a problem.

Herein, in a case where the reflecting mirror is connected to a rotary shaft of the motor or the like, it is also conceivable to divert a technology of a polygonal mirror used in, for example, a copying machine or the like. As a fixing method of the polygonal mirror, a method of screwing a polygonal mirror to a flange (step) provided on the rotary shaft in a state in which the former is fitted to be mounted on the latter. However, if the polygonal mirror is made of resin, the reflecting surface might be deformed by screwing, which leads to deterioration in accuracy of detection of the object.

On the other hand, Patent Literature 1 discloses a technology of avoiding distortion of a lens surface as much as possible by allowing a projection provided on a flange of an elongated fθ lens to abut a lens holding member to hold.

PRIOR ART DOCUMENT

Patent Document

Patent Document 1: WO 2013/047174

SUMMARY

Problems to be Solved by the Invention

The technology disclosed in Patent Literature 1 relates only to a technology of positioning and fixing the elongated fθ lens by utilizing the projection provided on the flange of the fθ lens, and there is no technological disclosure of application to a rotating member, that is, a positional relationship between the projection and the rotary shaft. That is, Patent Literature 1 does not disclose or suggest a technology capable of connecting an optical element to a motor or the like while suppressing distortion and deformation of the reflecting surface.

The present invention is achieved in view of the above circumstances, and an object thereof is to provide a mirror unit which may be connected to a driving body while suppressing distortion and deformation of a reflecting surface and an optical scanning type object detection device.

Means for Solving Problems

To achieve at least one of the abovementioned objects, according to an aspect of the present invention, an optical unit includes:

an optical element made of resin obtained by integrally forming a reflector in which a reflecting surface which reflects a light flux is formed on an outer peripheral side surface, and a flange extending in a direction orthogonal to the reflector to support the reflector;

a rotary driving body which rotates the optical element; and a connecting device which connects the flange of the optical element to the rotary driving body, the optical element being capable of rotating around a rotational axis of the rotary driving body, wherein, in the flange, three or more first convex surfaces with arc-shaped cross-section are formed on one side in a direction of the rotational axis and three or more second convex surfaces with arc-shaped cross-section are formed on an other side in the direction of the rotational axis, wherein the connecting device includes a first fixation member which simultaneously abuts the first convex surfaces with arc-shaped cross-section, a second fixation member which simultaneously abuts the second convex surfaces with arc-shaped cross-section, a pusher which pushes in a direction in which each convex surface with arc-shaped cross-section and each fixation member face each other, and a connector which connects the rotary driving body to the first or second fixation member, wherein the flange is formed such that the rotational axis of the rotary driving body passes through a triangle formed by connecting three surface apices of the first convex surfaces with arc-shaped cross-section and a triangle formed by connecting three surface apices of the second convex surfaces with arc-shaped cross-section, wherein a normal at an abutment point P1 to the first convex surface with arc-shaped cross-section in the first fixation member is substantially parallel to the rotational axis and passes through an abutment point P2 between the second fixation member and the second convex surface with arc-shaped cross-section corresponding to the abutment point P1, and wherein the first or second fixation member is formed to engage with an inner peripheral side surface of the optical element.

Advantageous Effects of Invention

According to the present invention, it is possible to provide a mirror unit which may be connected to a driving body while suppressing distortion and deformation of a reflecting surface and an optical scanning type object detection device.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

EMBODIMENTS FOR CARRYING OUT THE INVENTION

Hereinafter, one or more embodiments of the present invention will be described with reference to the drawings. However, the scope of the invention is not limited to the disclosed embodiments.

Figure 1:
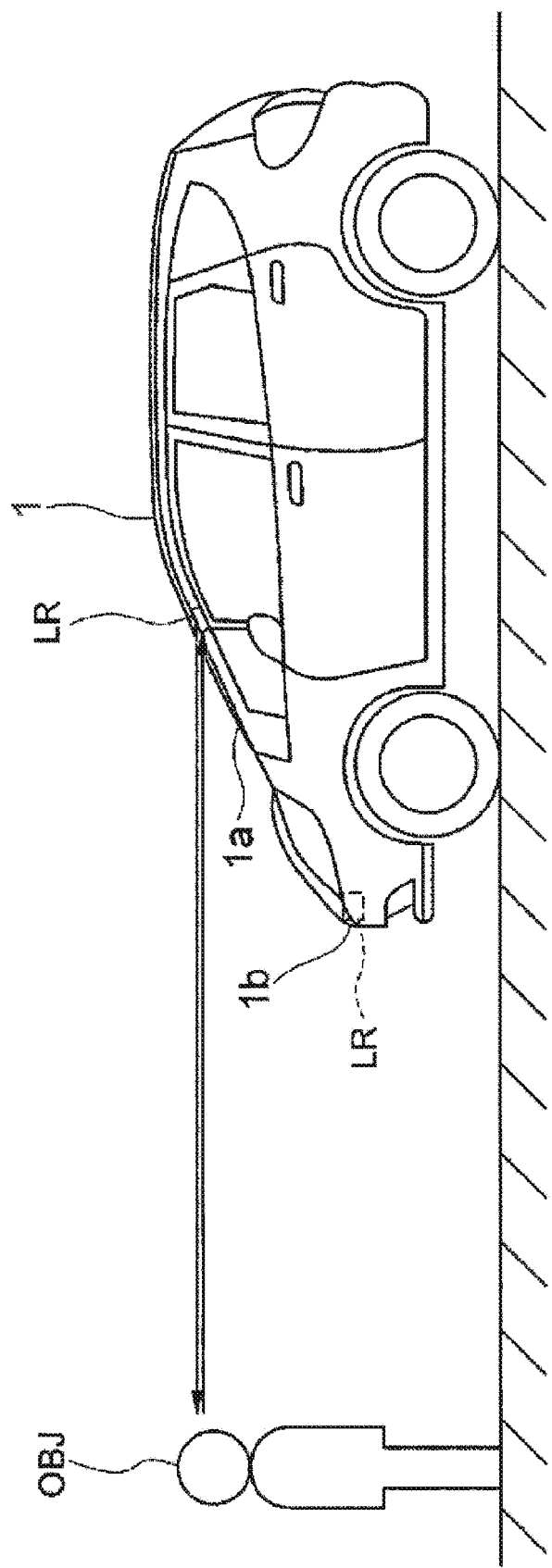
FIG. 1 is a schematic diagram illustrating a state in which a laser radar as an optical scanning type object detection device according to this embodiment is mounted on a vehicle.

An embodiment of the present invention is hereinafter described with reference to the accompanying drawings. FIG. 1 is a schematic diagram illustrating a state in which a laser radar as an optical scanning type object detection device according to this embodiment is mounted on a vehicle. However, the laser radar of this embodiment is not limited to an in-vehicle radar, and this may be mounted on a moving body such as a robot, an air vehicle, and a ship, or may be installed on a fixed object in traffic infrastructure such as a road and a railroad. A laser radar LR of this embodiment is provided behind a front window 1a or behind a front grill 1b of a vehicle 1.

Figure 2:
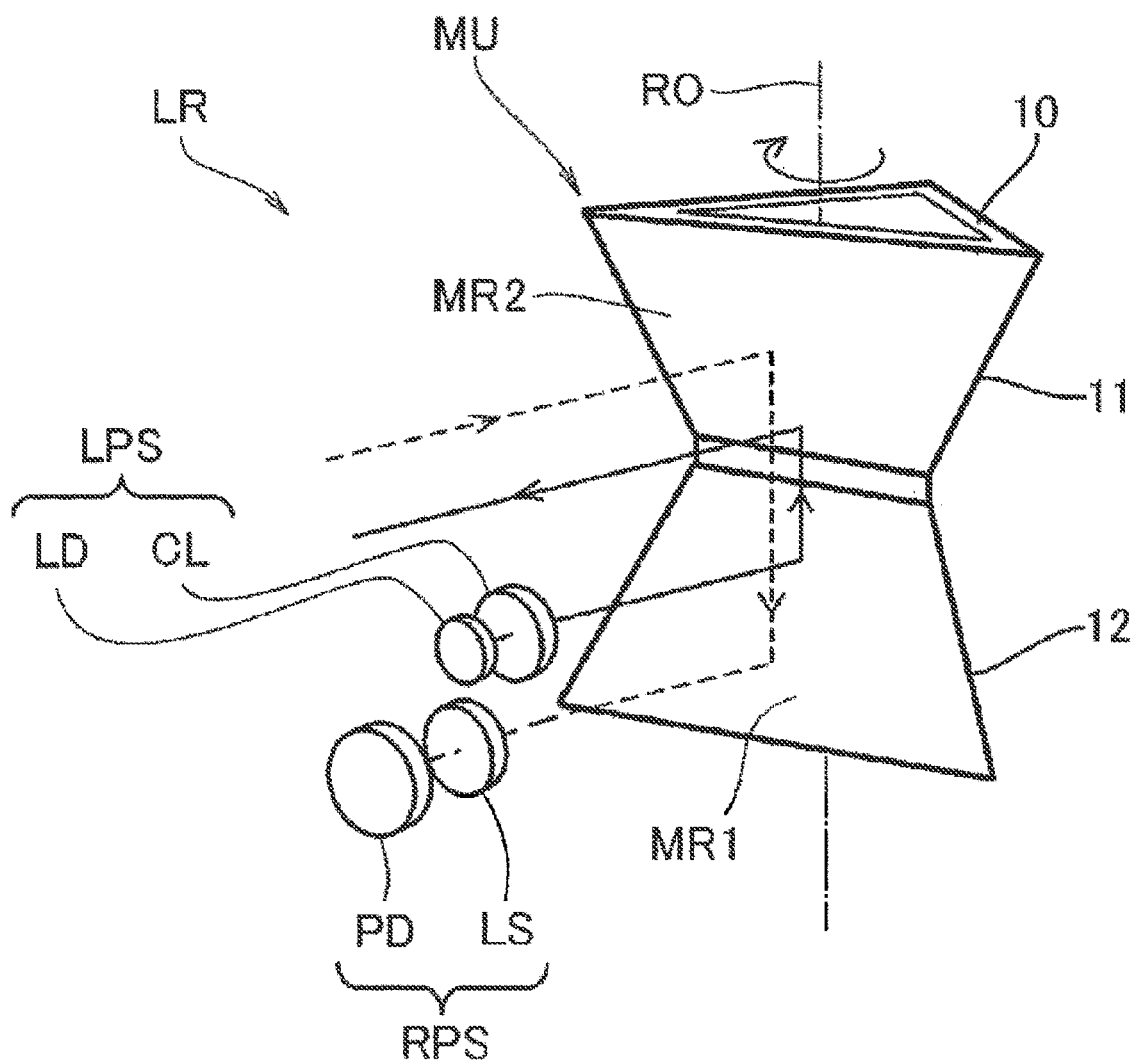
FIG. 2 is a schematic configuration diagram of a laser radar LR according to this embodiment.
Figure 3:
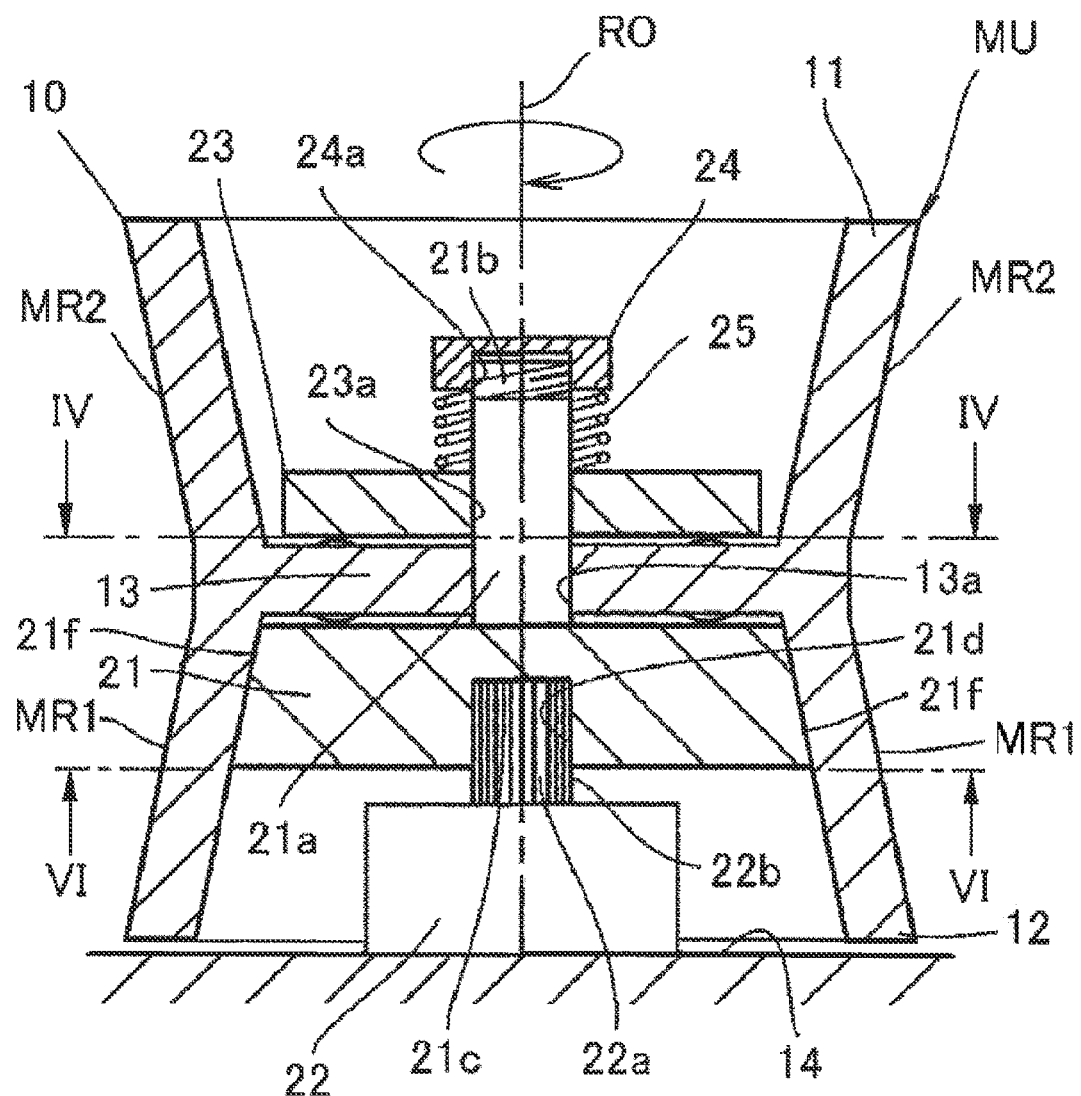
FIG. 3 is a cross-sectional view of a mirror unit MU used in the laser radar LR taken along a cross-section passing through a rotary shaft.
Figure 4:
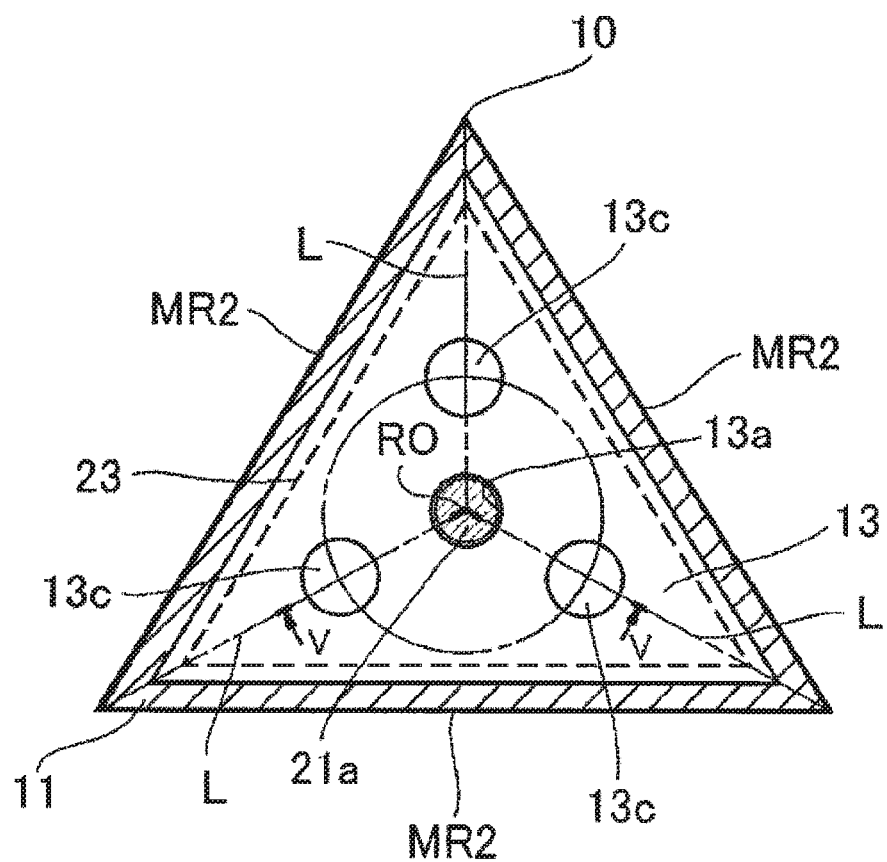
FIG. 4 is a cross-sectional view of a configuration of FIG. 3 taken along line IV-IV as seen in a direction of an arrow.
Figure 5:
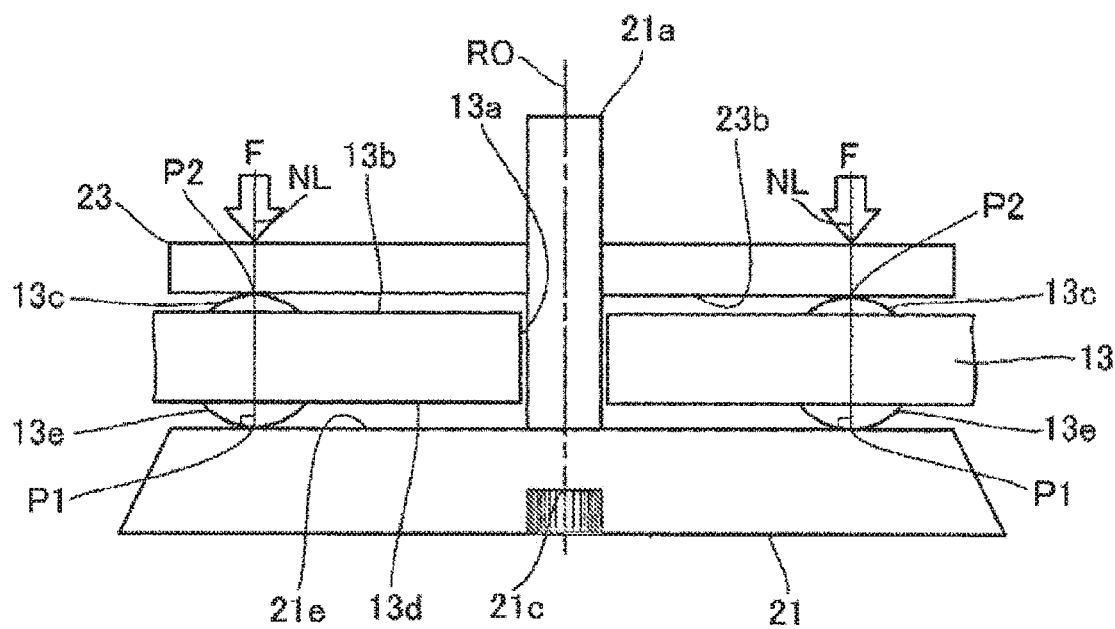
FIG. 5 is a cross-sectional view of the configuration of FIG. 4 taken along line V-V as seen in a direction of an arrow.
Figure 6:
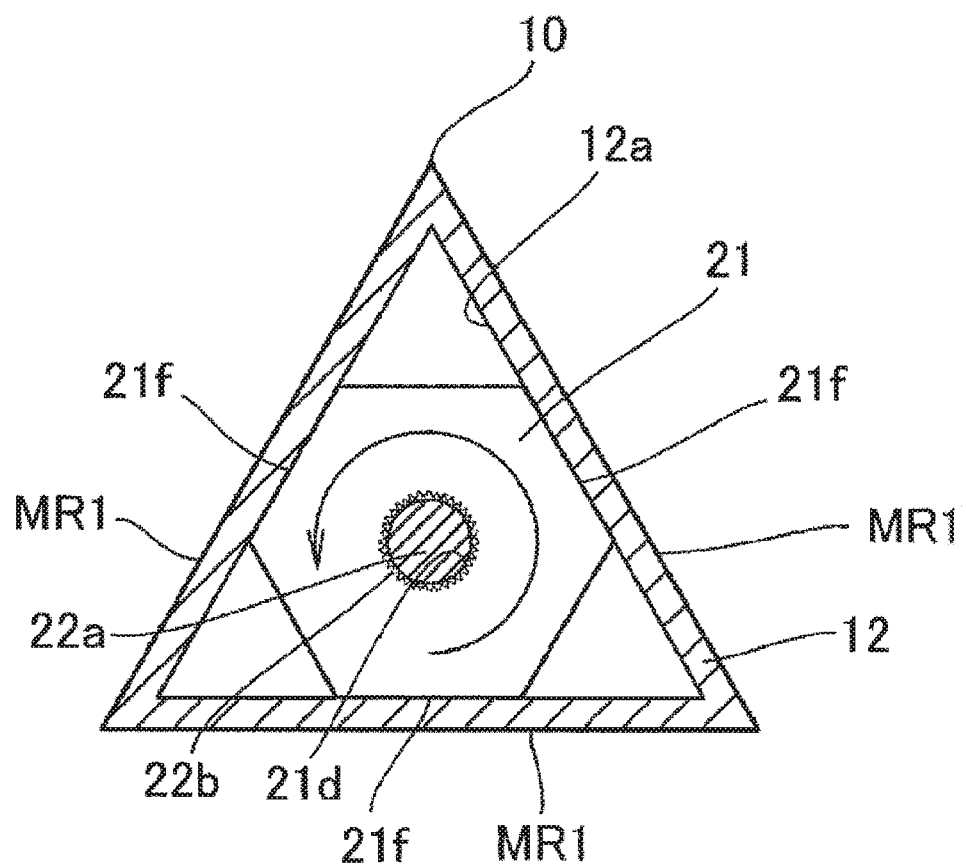
FIG. 6 is a cross-sectional view of the configuration of FIG. 3 taken along line VI-VI as seen in a direction of an arrow.

FIG. 2 is a schematic configuration diagram of the laser radar LR according to this embodiment. FIG. 3 is a cross-sectional view of a mirror unit MU used in the laser radar LR taken along a cross-section passing through a rotary shaft. FIG. 4 is a cross-sectional view of a configuration of FIG. 3 taken along line IV-IV as seen in a direction of an arrow. FIG. 5 is a cross-sectional view of a configuration of FIG. 4 taken along line V-V as seen in a direction of an arrow in which only a principal part is illustrated. FIG. 6 is a cross-sectional view of the configuration of FIG. 3 taken along line VI-VI as seen in a direction of an arrow.

In FIG. 2, the laser radar LR includes, for example, a pulse type semiconductor laser (light source) LD which emits a laser light flux, a collimator lens CL which converts diverging light from the semiconductor laser LD into parallel light, the mirror unit MU which projects the laser light which is made parallel by the collimator lens CL to an object OBJ side (FIG. 1) to scan by a rotating reflecting surface and reflects reflected light from the object OBJ on which the light is projected to scan, a lens LS which condenses the reflected light from the object OBJ reflected by the mirror unit MU, and a photodiode (light receiver) PD which receives the light condensed by the lens LS. The semiconductor laser LD and the collimator lens CL form a light projecting system LPS, and the lens LS and the photodiode PD form a light receiving system RPS.

As illustrated in FIG. 3, the mirror unit MU includes a polygonal mirror body 10 being an optical element. The polygonal mirror body 10 having an integral shape made of resin obtained by vertically connecting trigonal pyramids in opposite directions may be formed by injection molding. The polygonal mirror body 10 has an axis coinciding with a rotational axis RO and is provided with a plate-shaped flange 13 orthogonal to the rotational axis RO between a hollow upper pyramid portion 11 and a hollow lower pyramid portion 12. The upper pyramid portion 11 supported by the flange 13 to extend upward forms a first reflector, and the lower pyramid portion 12 supported by the flange 13 to extend downward forms a second reflector. A circular opening 13a is formed at the center of the flange 13. On an outer periphery of the upper pyramid portion 11, three reflecting surfaces MR2 are formed side by side in a circumferential direction, and on an outer periphery of the lower pyramid portion 12, three reflecting surfaces MR1 are formed side by side in the circumferential direction. The reflecting surfaces MR1 and MR2 are inclined toward the rotational axis RO to face each other.

In FIG. 3, a first fixation member 21 is provided below the flange 13. The first fixation member 21 made of metal or resin has a truncated hexagonal pyramidal shape (refer to FIG. 6) with a cylindrical shaft 21a implanted at the center of an upper surface thereof, the cylindrical shaft 21a penetrating the circular opening 13a to extend upward. A male screw 21b is formed at an upper end of the cylindrical shaft 21a. Also, a blind hole 21c is formed at the center of a lower surface of the first fixation member 21, and a female serration 21d is formed on an inner periphery thereof.

A motor 22 is fixed to a frame 14 of the laser radar. A male serration 22b is formed on an outer periphery of a rotary shaft (rotary driving body) 22a protruding above the motor 22, and the first fixation member 21 is configured to rotate integrally with the rotary shaft 22a by engagement of the male serration 22b with the female serration 21d. The male serration 22b and the female serration 21d form a connector. Meanwhile, it is also possible to make the rotary shaft 22a cylindrical and allow a screw (not illustrated) inserted from a side surface of the first fixation member 21 to abut the rotary shaft 22a, thereby fixing the first fixation member 21 to the rotary shaft 22a.

On the other hand, a plate-shaped second fixation member 23 is provided above the flange 13. The second fixation member 23 made of metal or resin has a triangular plate shape with a circular opening 23a formed at the center thereof. The cylindrical shaft 21a of the first fixation member 21 further penetrates the circular opening 23a to extend upward.

A hollow disc-shaped screw member 24 is attached to a tip end of the cylindrical shaft 21a by threadably mounting a female screw 24a provided on an inner periphery thereof on a male screw 21b formed at a tip end of the cylindrical shaft 21a. A coil spring 25 is arranged so as to be wound around the cylindrical shaft 21a with ends abutting an upper surface of the second fixation member 23 and a lower surface of the screw member 24. The second fixation member 23 is pushed to a side of the flange 13 by pressure of the coil spring 25 as a pusher. The male serration 22b of the rotary shaft 22a, the first fixation member 21 including the female serration 21d, the second fixation member 23, and the coil spring 25 form a connecting device.

When assembling the mirror unit MU, the cylindrical shaft 21a of the first fixation member 21 penetrates through the circular opening 13a of the polygonal mirror body 10 and the circular opening 23a of the second fixation member 23 to be assembled, and thereafter the coil spring 25 is further attached to the cylindrical shaft 21a and the screw member 24 is threadably mounted on the tip thereof, so that the polygonal mirror body 10, the first fixation member 21, and the second fixation member 23 may be integrated with one another. At that time, a load (pressure) of the coil spring 25 is preferably a load which does not cause displacement in an abutment portion even with vibration caused due to an operation environment, and specifically, this is preferably set to 2 to 5 N, for example.

In FIG. 5, three partially spherical portions 13c are formed on an upper surface 13b of the flange 13 of the polygonal mirror body 10. As illustrated in FIG. 4, the partially spherical portions 13c are arranged at an interval of 120° in a circumferential direction at the same distance from the rotational axis RO. An extended line of a straight line L connecting the rotational axis RO and an apex of the partially spherical portion 13c preferably passes through a corner of the upper pyramid portion 11 for effective utilization of a space.

Similarly, in FIG. 5, three partially spherical portions 13e are formed also on a lower surface 13d of the flange 13 of the polygonal mirror body 10. The partially spherical portion 13e preferably has the same shape as that of the partially spherical portion 13c, and this is preferably molded at the same time as the injection molding of the polygonal mirror body 10. However, the partially spherical portions 13c and 13e may have curvature radii different from each other, they may have an aspheric shape having a surface apex instead of the spherical shape, or three or more of them may be provided. The partially spherical portion 13e forms a first convex surface with arc-shaped cross-section, and the partially spherical portion 13c forms a second convex surface with arc-shaped cross-section. The flange 13 is configured such that the rotational axis RO passes through a triangle (preferably the center thereof) formed by connecting the surface apices of the three partially spherical portions 13e, and that the rotational axis RO passes through a triangle (preferably the center thereof) formed by connecting the surface apices of the three partially spherical portions 13c. This may secure excellent rotational balance of the polygonal mirror body 10 at the time of rotation.

The three partially spherical portions 13e abut simultaneously a flat upper surface 21e of the first fixation member 21, and the three partially spherical portions 13c abut simultaneously a flat lower surface 23b of the second fixation member 23. Herein, a normal NL at an abutment point P1 to the partially spherical portion 13e in the first fixation member 21 is substantially parallel to the rotational axis RO and passes through an abutment point P2 between the second fixation member 23 and the partially spherical portion 13c corresponding to the abutment point P1. Meanwhile, "substantially parallel" includes a case with inclination within ±2° with respect to perfect parallelism.

That is, when the pressure F of the coil spring 25 is given to the second fixation member 23, the pressure F is equally divided into three to be transmitted from the flat lower surface 23b of the second fixation member 23 to each partially spherical portion 13c on the upper surface 13b of the flange 13 along the normal NL. Furthermore, the pressure F equally divided into three is transmitted from each partially spherical portion 13e on the lower surface 13d of the flange 13 to the flat upper surface 21e of the first fixation member 21 abutting the same along the normal NL. Equal reaction force is generated at each abutment point, and they come into balance with each other. In other words, in this system, no external force is generated in a direction orthogonal to the normal NL in an ideal state.

Figure 7:
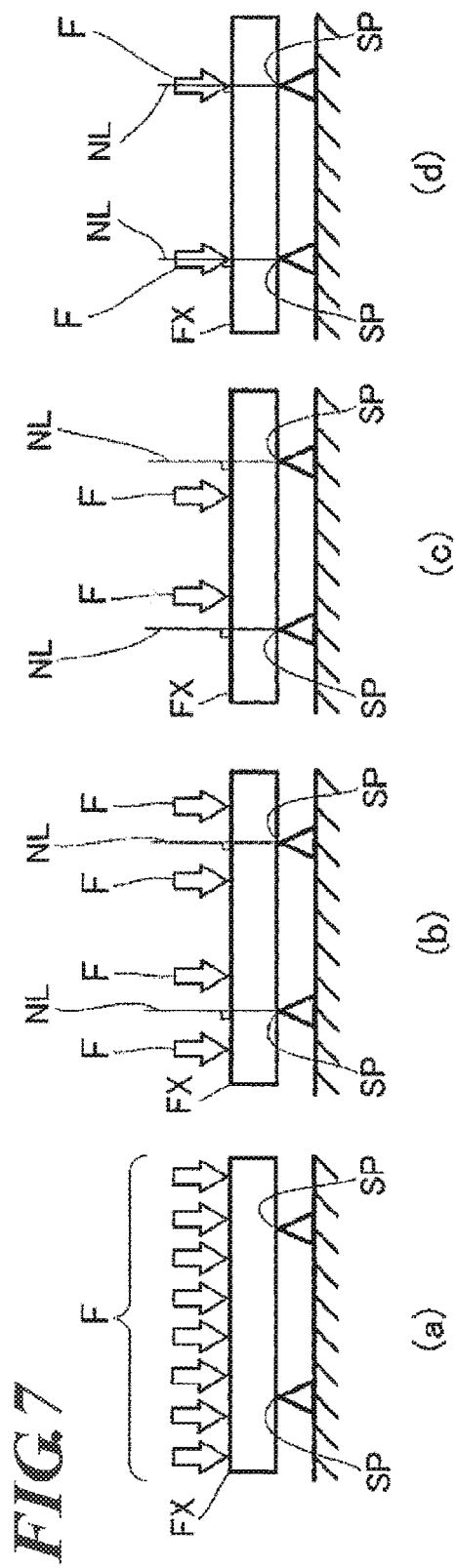
FIG. 7 illustrates models in which a position of external force given to a fixation member FX supported by two supporting points SP is changed.

A result of simulation performed by the present inventors is herein described. FIG. 7 illustrates models in which a position of the external force given to a fixation member FX supported by two supporting points SP is changed, and change in degree of flatness before and after giving the external force F in each model was obtained by the simulation. In FIG. 7 (a), the change in degree of flatness of the fixation member FX obtained as a PV value (difference between a highest point and a lowest point of the flat surface) was 2.9 µm in a state in which the total of 10 N of external force F equally distributed on an upper surface of the fixation member FX is given to the fixation member FX.

Furthermore, in FIG. 7 (b), the change in degree of flatness of the fixation member FX obtained as the PV value was 0.31 µm in a state in which the total of 10 N of external force F equally distributed to four points on both sides of surface normals NL to the fixation member FX passing through the two supporting points SP is given to the fixation member FX.

Furthermore, in FIG. 7 (c), the change in degree of flatness of the fixation member FX obtained as the PV value was 0.61 µm in a state in which the total of 10 N of external force F equally distributed to two points on an inner side of the surface normals NL to the fixation member FX passing through the two supporting points SP is given to the fixation member FX.

On the other hand, in FIG. 7 (d), the change in degree of flatness of the fixation member FX obtained as the PV value was 0.05 µm in a state in which the total of 10 N of external force F equally distributed to the surface normals NL to the fixation member FX passing through the two supporting points SP is given to the fixation member FX, and a degree of deformation is the smallest.

Since it is presumed that the above-described simulation result may be similarly applied also to a case of supporting by three points, as illustrated in FIG. 5, it is possible to suppress an amount of deformation of the flange 13 as much as possible by arranging such that the normal NL at the abutment point P1 to the partially spherical portion 13e in the first fixation member 21 is parallel to the rotational axis RO and passing through the abutment point P2 between the second fixation member 23 and the partially spherical portion 13c corresponding to the abutment point P1. If the amount of displacement of the flange 13 may be kept small at the time of fixing by the first fixation member 21 and the second fixation member 23, deformation of the upper pyramid portion 11 and the lower pyramid portion 12 connected to the flange 13 may be suppressed, so that the degree of flatness and angles of the reflecting surfaces MR1 and MR2 may be secured with a high degree of accuracy and high-accuracy measurement may be realized.

Furthermore, as seen in a direction indicated in FIG. 6, an inner peripheral surface 12a of the lower pyramid portion 12 has a regular triangular shape, and an outer shape of the first fixation member 21 is a regular hexagonal shape. Also, three of outer peripheral surfaces 21f of the first fixation member 21 have the same inclination angle as that of the inner peripheral surface 12a of the lower pyramid portion 12, and they abut closely each other. As a result, the first fixation member 21 and the lower pyramid portion 12 are fixed in a rotational direction. Therefore, when the motor 22 is supplied with power from an external power supply not illustrated and the rotary shaft 22a rotates, the second fixation member 21 fixedly connected to the rotary shaft 22a by serration connection (22b and 21d) rotates, and further, the polygonal mirror body 10 rotates via the lower pyramid portion 12. In contrast, since the second fixation member 23 is pushed toward the flange 13 by the coil spring 25, this rotates together with the cylindrical shaft 21a. Herein, even if a rotational speed of the mirror unit MU increases and the mirror unit MU cannot be maintained by the pressure of the coil spring 25 any more, the outer peripheral surface 21f of the connector and the inner peripheral surface 12a of the flange abut each other, so that the rotation of the mirror unit MU is maintained. Meanwhile, three outer peripheral surfaces 21f are sufficient for allowing the same to abut the inner peripheral surface 12a of the lower pyramid portion 12, so that the outer shape of the first fixation member 21 is not necessarily the regular hexagonal shape.

Ranging operation of the laser radar LR is next described. In FIG. 2, the diverging light intermittently emitted from the semiconductor laser LD in a pulsed manner is converted into a parallel light flux by the collimator lens CL to be incident on the reflecting surface MR1 of the rotating polygonal mirror body 10 and reflected there, then travels along the rotational axis RO to be further reflected by the reflecting surface MR2, and thereafter transmitted through a transparent plate TR to be projected on the external object OBJ side to scan.

Figure 8:
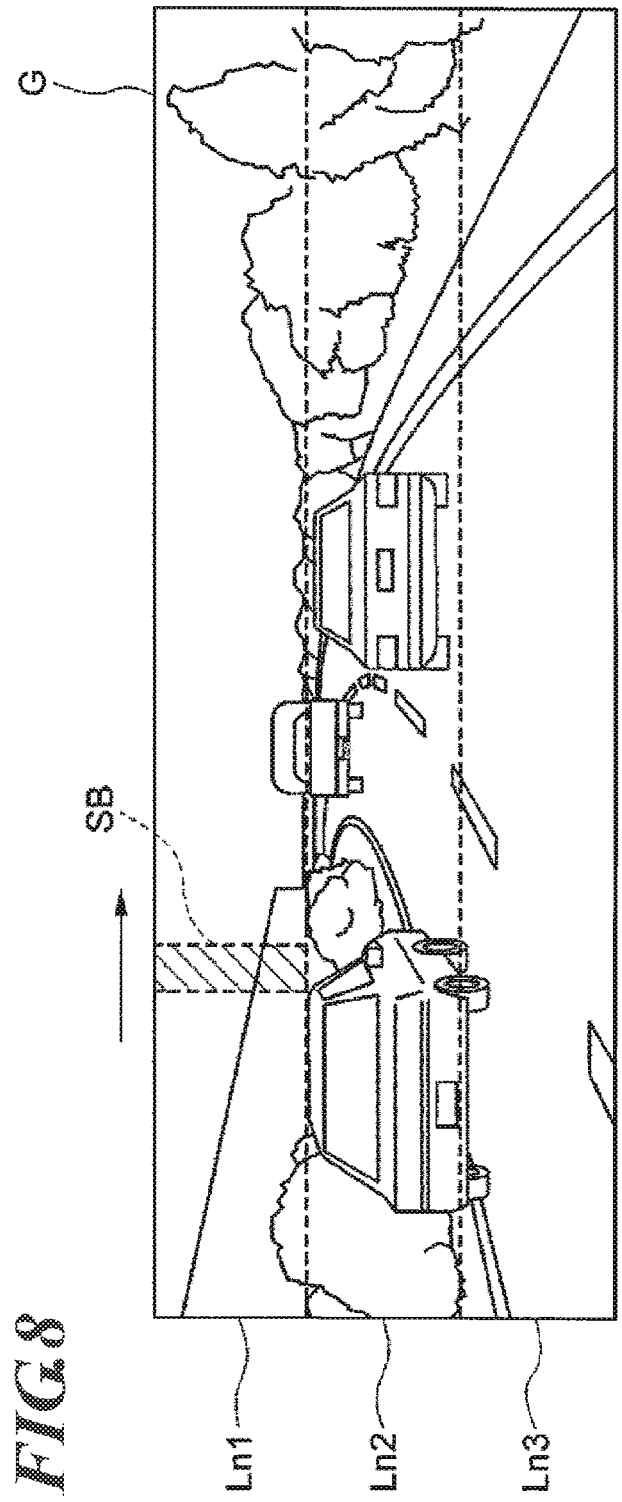
FIG. 8 is a view illustrating a state of scanning on a screen G being a detection range of the laser radar LR with emitted laser spot light SB in accordance with rotation of a polygonal mirror body 10.

FIG. 8 is a view illustrating a state of scanning on a screen G being a detection range of the laser radar LR with emitted laser spot light SB (indicated by hatching) in accordance with the rotation of the polygonal mirror body 10. Intersecting angles are different between combinations of the reflecting surface MR1 and the reflecting surface MR2 of the polygonal mirror body 10. Laser light is sequentially reflected by the rotationally moving reflecting surfaces MR1 and MR2. The laser light first reflected by a first pair of the reflecting surfaces MR1 and MR2 scans an uppermost area Ln1 of the screen G from left to right in a horizontal direction in accordance with the rotation of the polygonal mirror body 10. Next, the laser light reflected by a second pair of the reflecting surfaces MR1 and MR2 scans a second area Ln2 from the top of the screen G from left to right in the horizontal direction in accordance with the rotation of the polygonal mirror body 10. Next, the laser light reflected by a third pair of the reflecting surfaces MR1 and MR2 scans a third area Ln3 from the top of the screen G from left to right in the horizontal direction in accordance with the rotation of the polygonal mirror body 10. As a result, scanning of one screen is completed. Then, after the polygonal mirror body 10 rotates once, when the first pair of the reflecting surface MR1 and the reflecting surface MR2 returns, the scanning from the top of the screen G is repeated again.

In FIG. 2, the laser light which strikes the object OBJ to be reflected among the projected light flux for scanning is incident on the reflecting surface MR2 of the polygonal mirror body 10 to be reflected there, travels along the rotational axis RO, and is further reflected by the reflecting surface MR1, condensed by the lens LS, and is detected on the light receiving surface of the photodiode PD. As a result, it is possible to detect the object OBJ in an entire range of the screen G.

Figure 9:
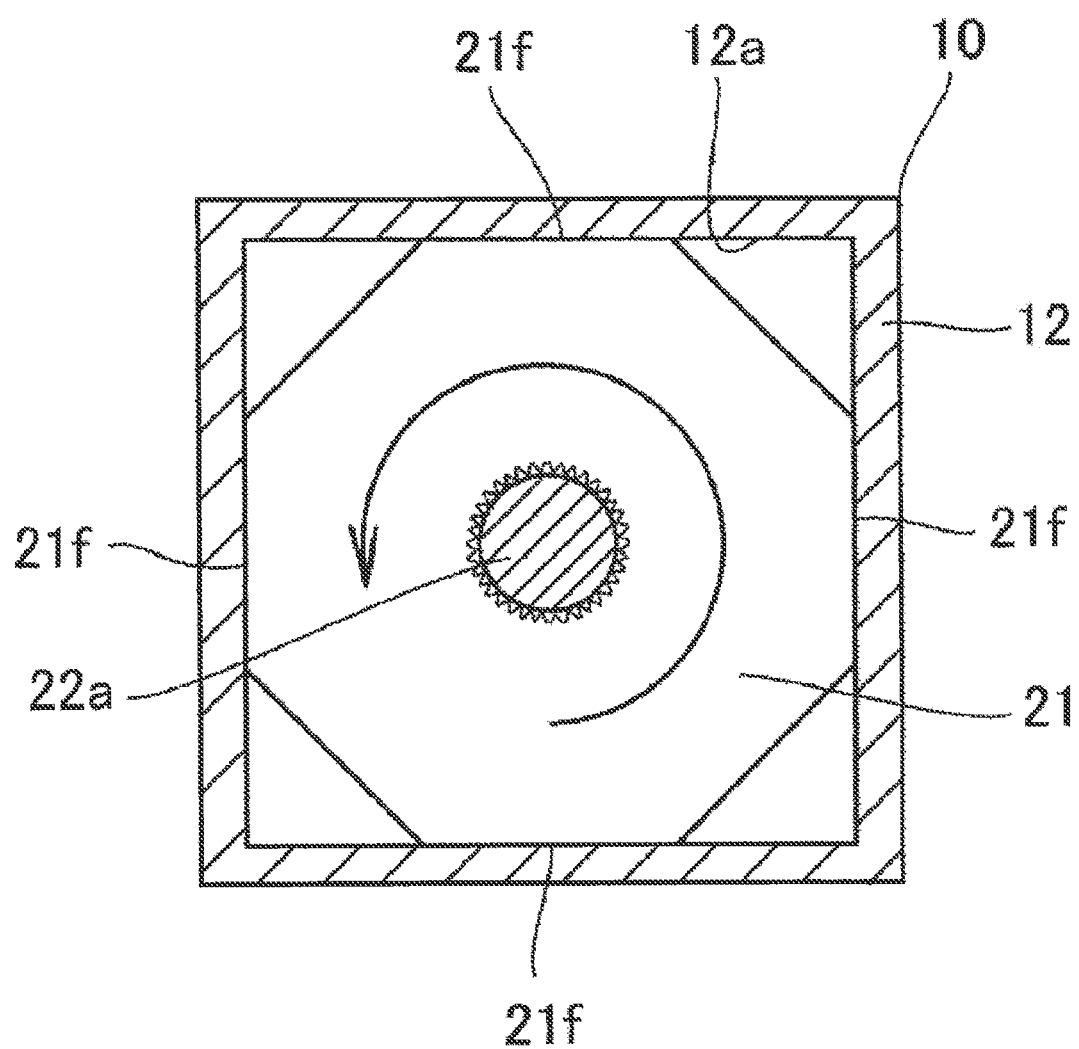
FIG. 9 is a cross-sectional view similar to FIG. 6 according to a modification of this embodiment.

FIG. 9 is a cross-sectional view similar to FIG. 6 of a modification of this embodiment. In this modification, a polygonal mirror body 10 has an integral shape made of resin obtained by vertically connecting quadrangular pyramids in opposite directions, a lower pyramid portion 12 including four reflecting surfaces MR1, and the same is true for an upper pyramid portion although not illustrated. Furthermore, as seen in a direction indicated in FIG. 9, an inner peripheral surface 12a of the lower pyramid portion 12 has a regular square shape, and an outer shape of a first fixation member 21 is a regular octagonal shape. By allowing four of outer peripheral surfaces 21f of the first fixation member 21 to abut the inner peripheral surface 12a of the lower pyramid portion 12, the first fixation member 21 and the lower pyramid portion 12 are fixed to each other in a rotational direction. Other configurations are similar to those of the above-described embodiment.

The present invention is not limited to the embodiments and modifications described in the specification, and it is obvious for one skilled in the art that this includes another embodiment and modification from the embodiments described in this specification and technical concepts. The description in the specification and the embodiments are for illustrative purposes only, and the scope of the present invention is described in following claims.

Although embodiments of the present invention have been described and illustrated in detail, it is clearly understood that the same is by way of illustration and example only and not limitation, the scope of the present invention should be interpreted by terms of the appended claims.

DESCRIPTION OF REFERENCE SIGNS

1 Vehicle
1a Front window
1b Front grill
10 Polygonal mirror body
11 Upper pyramid portion
12 Lower pyramid portion
12a Inner peripheral surface
13 Flange
13a Circular opening
13b Upper surface
13c Partially spherical portion
13d Lower surface
13e Partially spherical portion
14 Flame
21 First fixation member 21a Cylindrical shaft
21b Flat lower surface
21c Blind hole
21d Female serration
21e Flat upper surface
21f Outer peripheral surface
22 Motor
22a Rotary shaft
22b Male serration
23 Second fixation member
23a Circular opening
23b Flat lower surface
24 Screw member
25 Coil spring
CL Collimator lens
F Pressure
LD Semiconductor laser
LR Laser radar
LS Lens
MR1, MR2 Reflecting surface
MU Mirror unit
OBJ Object
PD Photodiode

The invention claimed is:

1. An optical unit comprising:
   an optical element made of resin obtained by integrally forming a reflector in which a reflecting surface which reflects a light flux is formed on an outer peripheral side surface, and a flange extending in a direction orthogonal to the reflector to support the reflector;
   a rotary driving body which rotates the optical element; and
   a connecting device which connects the flange of the optical element to the rotary driving body, the optical element being capable of rotating around a rotational axis of the rotary driving body,
   wherein, in the flange, three or more first convex surfaces with arc-shaped cross-section are formed on one side in a direction of the rotational axis and three or more second convex surfaces with arc-shaped cross-section are formed on another side in the direction of the rotational axis,
   wherein the connecting device includes a first fixation member which simultaneously abuts the first convex surfaces with arc-shaped cross-section, a second fixation member which simultaneously abuts the second convex surfaces with arc-shaped cross-section, a pusher which pushes in a direction in which each convex surface with arc-shaped cross-section and each fixation member face each other, and a connector which connects the rotary driving body to the first or second fixation member,
   wherein the flange is formed such that the rotational axis of the rotary driving body passes through a triangle formed by connecting three surface apices of the first convex surfaces with arc-shaped cross-section and a triangle formed by connecting three surface apices of the second convex surfaces with arc-shaped cross-section,
   wherein a normal at an abutment point P1 to the first convex surface with arc-shaped cross-section in the first fixation member is substantially parallel to the rotational axis and passes through an abutment point P2 between the second fixation member and the second convex surface with arc-shaped cross-section corresponding to the abutment point P1, and
   wherein the first or second fixation member is formed to engage with an inner peripheral side surface of the optical element.

2. The optical unit according to claim 1, wherein the reflector is formed of a first reflector extending from the flange to one side and a second reflector extending from the flange to the other side, and a reflecting surface of the first reflector and a reflecting surface of the second reflector are inclined toward the rotational axis to face each other.

3. The optical unit according to claim 1, wherein, as seen in the direction of the rotational axis, an inner peripheral side surface of the reflector has a regular triangular shape, and an outer periphery of the fixation member which engages with the inner peripheral side surface has a hexagonal shape.

4. The optical unit according to claim 1, wherein, as seen in the direction of the rotational axis, an inner peripheral side surface of the reflector has a square shape, and an outer periphery of the fixation member which engages with the inner peripheral side surface has a regular octagonal shape.

5. An optical scanning type object detection device comprising:
   the optical unit according to claim 1;
   a light source; and
   a light receiver,
   wherein a light flux emitted from the light source is reflected by a reflecting surface of the optical unit which rotates and is projected on an object while scanning, and
   wherein the light flux reflected by the object is reflected by the reflecting surface and is thereafter received by the light receiver.

* * * * *